(12) United States Patent
Hind et al.

(10) Patent No.: US 8,099,600 B2
(45) Date of Patent: Jan. 17, 2012

(54) CONTENT DISTRIBUTION SITE SPOOFING DETECTION AND PREVENTION

(75) Inventors: John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 2458 days.

(21) Appl. No.: 10/923,964

(22) Filed: Aug. 23, 2004

(65) Prior Publication Data

US 2006/0041754 A1    Feb. 23, 2006

(51) Int. Cl.
*H04L 29/06* (2006.01)
(52) U.S. Cl. .......... 713/176; 713/150; 713/168; 705/75; 705/67; 380/255; 380/229
(58) Field of Classification Search .................. 713/168, 713/176; 380/229; 705/67, 75
See application file for complete search history.

(56) References Cited

U.S. PATENT DOCUMENTS

| | | | |
|---|---|---|---|
| 6,442,696 B1 | 8/2002 | Wray et al. | |
| 6,449,599 B1 | 9/2002 | Payne et al. | |
| 6,839,842 B1* | 1/2005 | Iverson et al. | 713/176 |
| 7,024,558 B1* | 4/2006 | Satake | 713/176 |
| 7,152,242 B2* | 12/2006 | Douglas | 726/23 |
| 2002/0124172 A1 | 9/2002 | Manahan | |
| 2002/0129238 A1 | 9/2002 | Toh et al. | |
| 2002/0144120 A1 | 10/2002 | Ramanathan | |
| 2003/0163567 A1 | 8/2003 | McMorris et al. | |
| 2003/0182549 A1 | 9/2003 | Hallin et al. | |
| 2003/0188194 A1 | 10/2003 | Currie et al. | |
| 2003/0196117 A1* | 10/2003 | Kenmochi et al. | 713/201 |
| 2004/0030784 A1 | 2/2004 | Abdullhayoglu | |

FOREIGN PATENT DOCUMENTS

| | | |
|---|---|---|
| JP | 2000-078125 | 3/2000 |
| JP | 2003-338815 | 11/2003 |

\* cited by examiner

*Primary Examiner* — Edan Orgad
*Assistant Examiner* — Roderick Tolentino
(74) *Attorney, Agent, or Firm* — Steven M. Greenberg, Esq.; Carey, Rodriguez, Greenberg & O'Keefe

(57) ABSTRACT

A method, system and apparatus for detecting and preventing content distribution site impersonation. In this regard, a method for detecting and preventing content distribution site spoofing can include the steps of loading a markup language document and a corresponding digital signature for processing and ensuring that the digital signature originates from a pre-specified source of the markup language document incorporated within the markup language document. The method further can include the steps of dynamically computing a hash value for the markup language document and comparing the dynamically computed hash value to a hash value encrypted within the digital signature. Finally, the method can include the step of detecting content distribution site spoofing either if the digital signature does not originate from the pre-specified source, or if the dynamically computed hash value does not match the hash value encrypted within the digital signature.

18 Claims, 3 Drawing Sheets

CONTENT DISTRIBUTION SITE SPOOFING DETECTION AND PREVENTION

BACKGROUND OF THE INVENTION

1. Statement of the Technical Field

The present invention relates to the field of data communications security and encryption and more particularly to signing and validating network distributable content.

2. Description of the Related Art

Malicious computer users, commonly referred to as "hackers", have grown bolder each day, adding to their growing repertory of hacking exploits while leveraging new combinations of old exploits to create new threats of ever increasing sophistication. Each new threat generally attempts to perpetrate an on-line fraud of which the computing public is to remain unaware. One type of on-line scam which has become prevalent involves the creation and wide-scale distribution of an electronic message (e-mail) that appears to the casual user to have originated from a trusted party.

Typically, the message within the email can demand that the recipient select a hyperlink within the e-mail, or can cajole the recipient into selecting the hyperlink. Unbeknownst to the recipient, the hyperlink can lead to a content distribution site such as a Web site designed to obtain personal and confidential information. As an alternative, the message can ask the recipient to "re-enter" personal information such as a user identifier, password, credit card number or account number. As yet another alternative, the e-mail message can threaten to terminate the e-mail account of the recipient, assign the recipient a bad credit rating, or charge the credit card of the recipient unless the recipient provides certain personally identifying information.

As it will be apparent to the skilled artisan, the foregoing e-mail scam represents a confidence game having the sole purpose of persuading recipients to voluntarily provide personal information which later can be used for various fraudulent purposes. As noted, the hyperlink in the e-mail message typically directs the e-mail message recipient to a hacker-operated content distribution site which impersonates a content distribution site of a trusted party known and expected by the recipient. Non-email schemes for directing a victim to a hacker-operated content distribution site also are known and include Web advertising, search engine stuffing, "bogus" news or discussion group postings, or even an innocuous-appearing security site created by the hacker helpfully purporting to direct the user to an official bug-fix site.

Central to the hacker scam is the ability of the hacker to convincingly impersonate the trusted content distribution site. The degree of realism depends upon the specific techniques used by the hacker, as well as the gullibility of the user. The effectiveness of the sham also can vary with the version, patch level, and configuration settings of a content browser. Several variations exist in respect to this scam. For instance, in one variation, a complete copy of a Web site can be created and hosted at a different Web site controlled by the hacker. The link to the spoof Web site can be constructed to appear as if the link refers to the legitimate site, though critical portions of the link will cause the misdirection of the link to the hacker controlled site. In another variation, the spoof content distribution site can be hosted at a domain which is but a misspelled derivative of the actual content distribution site.

U.S. patent application Publication No. 2002/0124172 to Manahan for METHOD AND APPARATUS FOR SIGNING AND VALIDATING WEB PAGES (hereinafter, "Manahan") addresses the general problem of spoofing a Web site. In the Manahan publication, a Web page can be digitally signed using a private key to provide a digital signature. The Web page, digital signature and a digital certificate can be transmitted to the Web content browser of an end user which can use the digital certificate and digital signature to verify the content of the Web page. Nevertheless, the technology of the Manahan publication cannot account for the spoofing of the Web site itself from which the content originates.

Notably, the technology disclosed in the Manahan publication protects the integrity of the content, but does nothing to assure that the content is delivered from a known server. That is, in the Manahan publication, if signed content simply is copied intact and re-hosted on a different server controlled by a hacker, that server will distribute the original content and signature, which the user's browser will verify as being correct. In this situation the user's browser will not detect the danger that any personal information entered in response to the spoofed content is placed into the hands of an untrusted party, rather than the content owner who signed the content. In other words, where a victim inadvertently visits a spoofed Web site, the Manahan arrangement will be ineffective to protect the victim from the scam.

SUMMARY OF THE INVENTION

The present invention addresses the deficiencies of the art in respect to content distribution site spoofing and provides a novel and non-obvious method, system and apparatus for detecting and preventing content distribution site impersonation. In this regard, a method for detecting and preventing content distribution site spoofing can include the steps of loading a markup language document and a corresponding digital signature for processing and ensuring that the digital signature originates from a pre-specified source of the markup language document incorporated within the markup language document.

The method further can include the steps of dynamically computing a hash value for the markup language document and comparing the dynamically computed hash value to a hash value encrypted within the digital signature. Finally, the method can include the step of detecting content distribution site spoofing either if the digital signature does not originate from the pre-specified source, or if the dynamically computed hash value does not match the hash value encrypted within the digital signature.

The loading step can include the step of extracting the digital signature from the markup language document. Also, the ensuring step can include the step of comparing a domain for the digital signature to a domain embedded in a field in the markup language document to ensure that the digital signature originates from the embedded domain. Notably, the method additionally can include the step of further ensuring that the markup language document originates from a host server at the pre-specified source. Similarly, the method additionally can include the step of further ensuring that the markup language document originates from a host server at the embedded domain. Finally, the method additionally can include the steps of extracting at least one Internet Protocol address from the markup language document and ensuring that the markup language document originates from a host server having an Internet Protocol address included among the extracted Internet Protocol addresses.

In a preferred aspect of the invention, an embedded slogan can be retrieved from a digital certificate associated with the markup language document. Subsequently, the markup language document can be modified to render the embedded slogan near a portion of the markup language document referencing a pre-specified slogan. In this way, to the extent that the slogan is not rendered near the portion of the markup language document referencing the pre-specified slogan, it will be visually apparent to the end user that the markup language document may have been spoofed. In any case, responsive to detecting content distribution site spoofing, the markup language document can be modified to render a warning message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for detecting and preventing content distribution site spoofing. In accordance with the present invention, a markup language document such as those distributed through content distribution sites such as Web sites can be digitally signed prior to transmission to a content consumer. Additionally, a source address can be embedded in the markup language document which corresponds to the source of the markup language document. Upon receipt of the digitally signed markup language document, the content consumer can process both the digital signature and the embedded source address to confirm the integrity and validity of the markup language document. Failing validation, a warning indicator perceptible by a human sense, such as sight or sound, can be rendered as part of or in association with the content to warn the content consumer of possible site spoofing.

Figure 1:
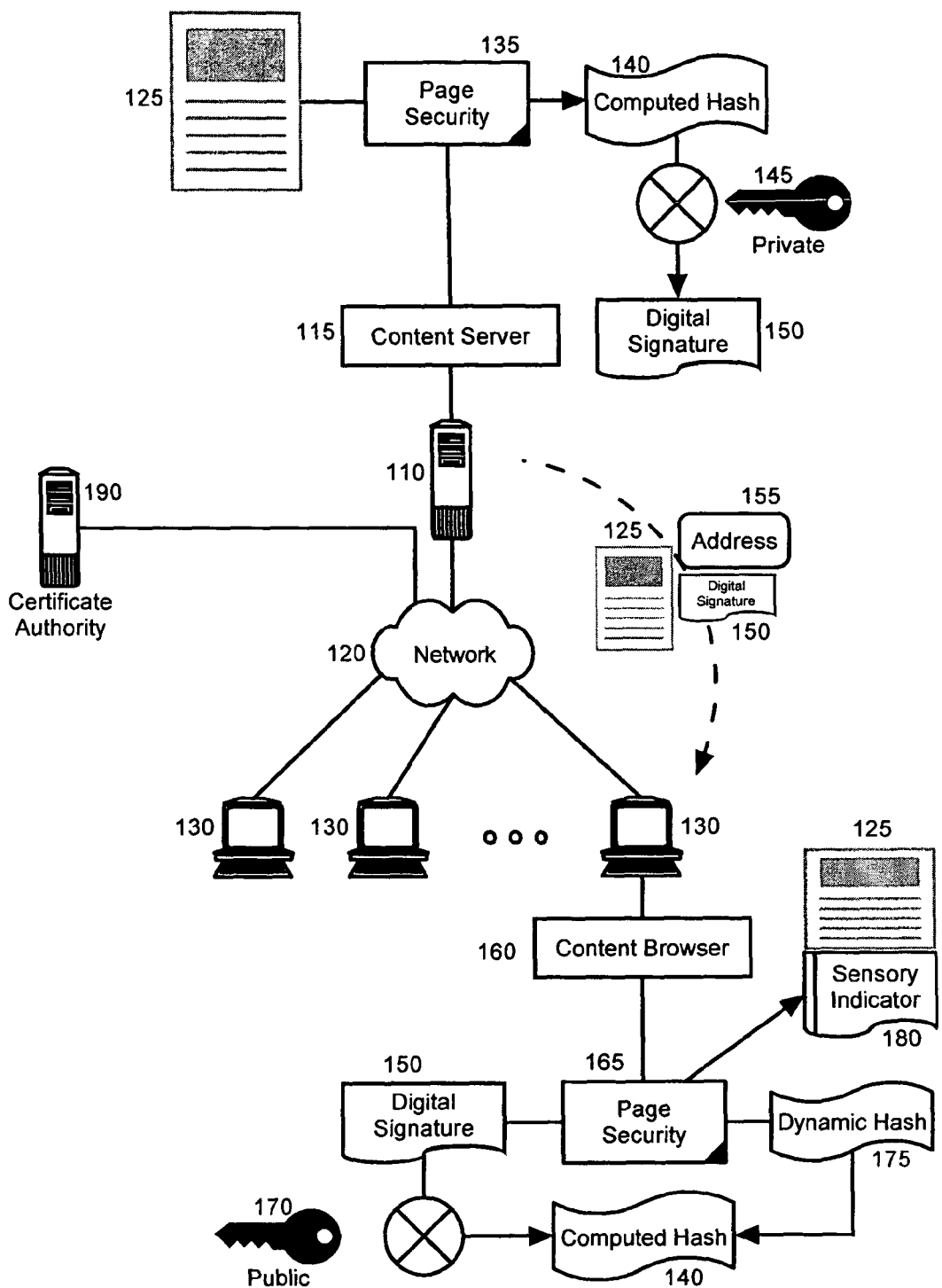
FIG. 1 is a schematic illustration of a system, method and apparatus for detecting and preventing content distribution site spoofing.

In more particular illustration of the foregoing inventive arrangement, FIG. 1 is a schematic illustration of a system, method and apparatus for detecting and preventing content distribution site spoofing. As shown in FIG. 1, a content distribution site 110 can be configured to deliver content to one or more content consumers 130 over a data communications network 120. The content distribution site 110, for example a Web site or other markup language distribution site, can include a content server 115 configured to respond to content requests from content consumers 130 by retrieving requested content and transmitting the requested content over the data communications network 120 to the requesting content consumers 130. The content consumers 130, in turn, can include a content browser 160 configured for rendering requested content for presentation to an end user in a manner perceptible to one or more human senses.

The content server 115 can be coupled to or can include server-side page security logic 135 programmed to configure a markup language document 125 for use in detecting and preventing content distribution site spoofing. In this regard, the server-side page security logic 135 can insert in the markup language document 125 one or more fields of security information, including addressing data 155 which can identify the address or identity of the content distribution site 110. For instance, the addressing data 155 can include a domain associated with the content distribution site 110, or one or more Internet protocol addresses associated with the content distribution site 110. The markup language document 125 further can include a reference to a certificate of authenticity as well as a source slogan (not shown) indicative of the source of the markup language document 125.

Figure 2:
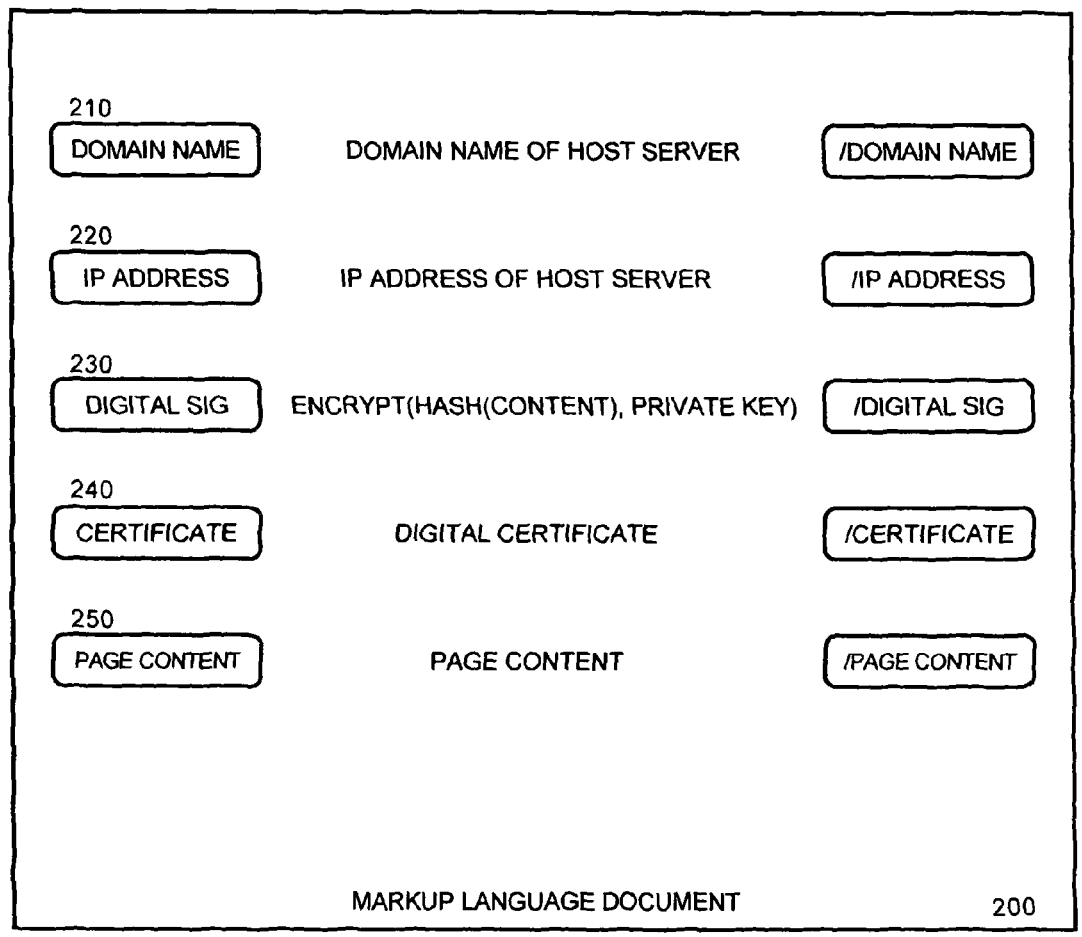
FIG. 2 is a block diagram illustrating a markup language document configured for use in the content distribution site spoofing detection and prevention system of FIG. 1; and, FIG. 3 is a flow chart illustrating a process for detecting and preventing content distribution site spoofing in accordance with the present invention.

In more particular illustration, FIG. 2 is a block diagram depicting a markup language document which has been configured for use in the Web site spoofing detection and prevention system of FIG. 1. The markup language document 200 can include markup language annotated content 250 so that the content 250 can be rendered by a content browser. Within the markup language document 200, however, one or more additional fields can be embedded so as to provide enhanced security for combating content distribution site spoofing.

Specifically, the expected domain name 210 of the host server for the markup language document 200 can be specified, as can one or more associated Internet Protocol addresses 220 of one or more host servers for the markup language document. Moreover, a digital certificate 240 can be included which can refer to the authentic source of the markup language document 200. Finally, a digital signature 230 can be included which can be an encrypted form of a hash value produced for the content of the markup language document 200 (excluding the digital signature 230 and digital certificate 240). In this way, page security logic coupled to or included within a content browser can be programmed to extract the foregoing fields 210, 220, 230, 240 to confirm the integrity of the content and source of the markup language document 200.

In this regard, returning now to FIG. 1, when preparing a markup language document 125 for distribution to requesting content consumers 130, the server-side page security logic 135 can compute a hash value 140 for the markup language document 125. The computed hash 140 further can be encrypted using a private key 145 associated with the content distribution site 110 and certificate 240 to produce a digital signature 150 for the markup language document 125. Accordingly, when requested by a content consumer 130, the content server 115 can forward to the requesting content consumer 130 each of the markup language document 125, the generated digital signature 150 and the addressing information 155 embedded in the markup language document 125. This addressing information 155 should match the source address field in the headers of data packets that carry the markup language document 125 over network 120.

Each of the content consumers 130 which have been configured for use in the Web site spoofing and detection system can include a content browser 160 coupled to or containing complementary client-side page security logic 165. The client-side page security logic 165 can compute a dynamic hash value 175 for a received markup language document 125. The client-side page security logic 165 further can retrieve a public key 170 associated with the private key 145 used to compute the digital signature 150 for content 125 through information provided by a certificate authority 190 which process is well-known in the art. The public key 170 can be used to decrypt the digital signature 150 to retrieve the computed hash 140.

The client-side page security logic 165 can compare the computed hash 140 to the dynamic hash 175 to verify the integrity of the content of the markup language document 125. Additionally, the client-side page security logic 165 can ensure that the source of the markup language document 125 matches the addressing data 155 embedded in the markup language document 125. If the integrity of the markup language document 125 can be determined by the client-side page security logic 165, a sensory indicator 180 can be rendered within or in association with the markup language document 125.

Moreover, as an added measure an embedded source slogan (not shown) can be extracted from the markup language document 125 and rendered within or in association with the markup language document 125 to match a specified source slogan incorporated as part of the markup language document 125. To the extent that the specified source slogan does not match the embedded source slogan (not shown) at the time of rendering the markup language document 125 in the content browser 160, it will be apparent to the end user that the integrity of the markup language document 125 has been compromised. Alternatively the source slogan can be a markup language fragment, and the markup language document 125 can contain incomplete markup to be completed by insertion of the markup language fragment, such that if the proper fragment is not inserted, the markup rendering will be defective in a manner that is readily apparent to the user of content browser 160. In this way, an optimal selection of blatant sensory cues can be provided to the end user within the markup language document 125 to combat content distribution site spoofing.

Figure 3:
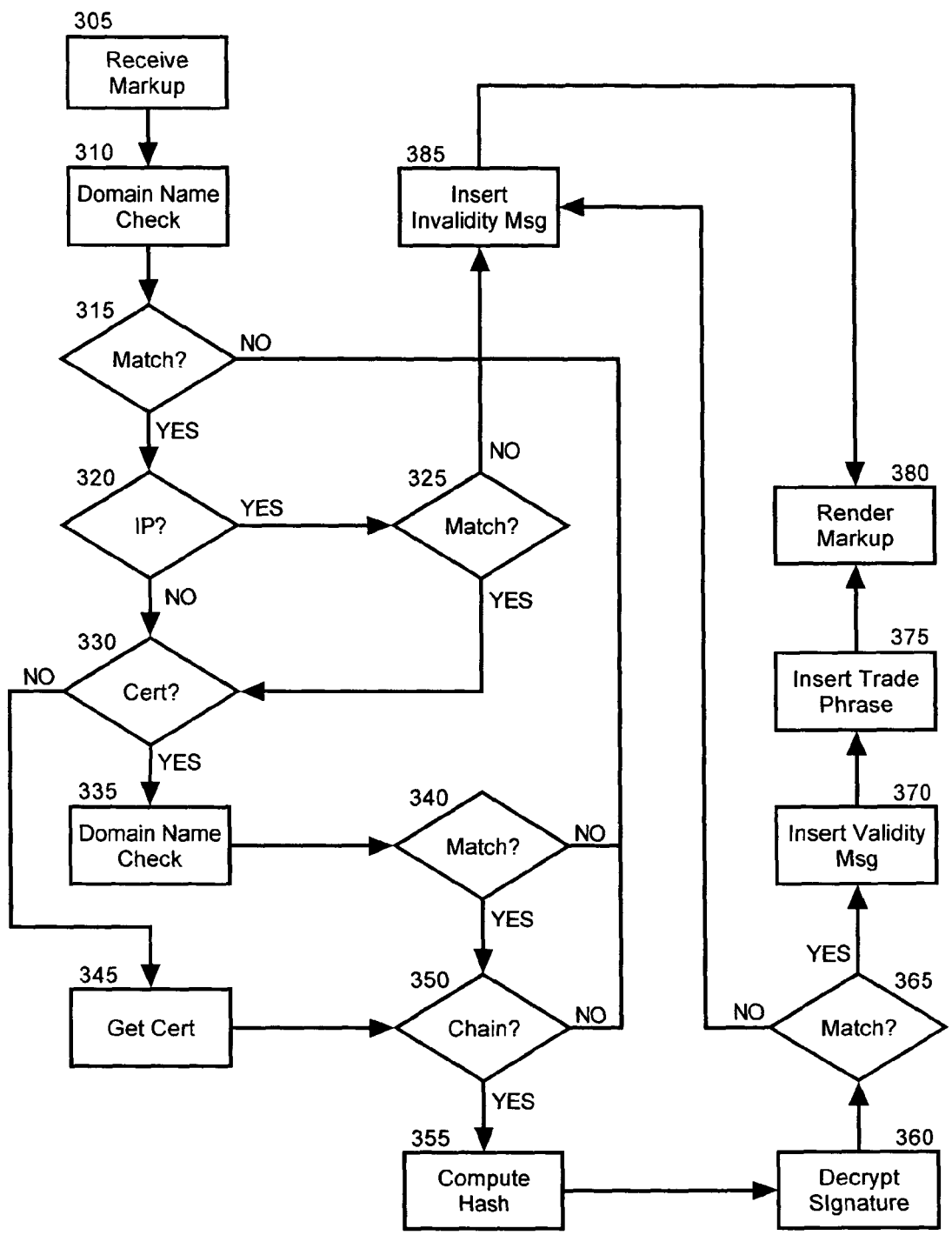

In further illustration, FIG. 3 is a flow chart illustrating the exemplary operation of the client-side page security logic. Though the flow chart includes a specific combination of remedial and prophylactic measures for detecting and preventing the spoofing of a content distribution site, the invention is not so limited to the precise arrangement reflected by the flow chart of FIG. 3. Rather, the skilled artisan will recognize any number effective combinations of measures which can be utilized in furtherance of the detection and prevention of content distribution site spoofing. As such, the scope of the present invention is best reflected in the language of the claims rather than in the exemplary embodiment illustrated herein.

Referring to FIG. 3 and beginning in block 305, a markup language document can be received for processing the client content browser. In block 310, the domain name included in the markup language document can be extracted and compared to the domain name of the host server from which the markup language document had been retrieved. If in decision block 315 a match cannot be confirmed, in block 385 the markup language document can be rendered with a prominently positioned invalidity message, such as "WARNING—The Authenticity Of This Document CANNOT Be Confirmed." Notably, the message can be posted as part of the rendered content, or as a separate document in a separate window or frame in the content browser.

Returning to decision block 315, if a match can be confirmed, in decision block 320 the markup language document can be inspected to determine if one or more Internet Protocol addresses have been embedded in the markup language document. If so, in decision block 325 the Internet Protocol address of the host server which provided the markup language document (typically obtained from the source address field in the transport header of data packets carrying the markup language) can be compared to one or more of the embedded addresses seeking a match. As before, if a match cannot be confirmed, in block 385 the markup language document can be rendered with a prominently positioned invalidity message. Otherwise, the process can continue in decision block 330.

In decision block 330, the markup language document can be inspected to determine if a certificate has been embedded in the markup language document. If so, in block 335 the domain name to which the certificate has been issued can be compared to the domain name field embedded in the markup language document. If in decision block 340 the domain name cannot be matched, an invalidity message can be rendered in block 385. Returning to decision block 330, if a certificate has not been embedded in the markup language document, a certificate can be retrieved from a third party certificate authority or public directory server in block 345 by passing the embedded domain name to the third party certificate authority or public directory server.

In either case, in decision block 350 it can be determined if the certificate trust chain is OK and that the certificate has not been self-signed by the source of the markup language document. If so, an invalidity message can be rendered in block 385. Otherwise, in block 355, a hash value can be computed for the markup language document excluding the digital certificate field and digital signature field of the markup language document. In block 360 the digital signature can be decrypted using the public key specified by the certificate. In decision block 365, if the hash within the decrypted signature does not match the computed hash, again an invalidity message can be rendered in block 385. Otherwise, a validity message can be rendered in block 370.

Notably, to discourage hackers from exploiting the client-side page security logic by re-signing content with hacker originated certificates, the certificate field of the markup language document can include an embedded source slogan such as a trade phrase which the certificate authority can verify at the time of certificate issuance. Consequently, in block 375 the trade phrase can be inserted in place of the document signature markup and the markup language document itself can include the trade phrase so that any inconsistency will be recognizable when, in block 380, the document markup is rendered in the content browser to produce the page. Alternatively the source slogan can be a markup language fragment designed to complete an incomplete markup language document, that when absent or incorrect results in an obvious defective rendering, and when present and correct results in completion and a perceptually correct rendering. The source slogan as yet another alternative can be an image or a portion of an image, that when correctly combined with the markup language document yields an image (such as a trademark) certified by a certificate authority at the time of certificate issuance, or when absent yields an obviously defective rendering of the image.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for detecting and preventing content distribution site spoofing comprising the steps of:
   loading a markup language document and a corresponding digital signature for processing;
   ensuring that said digital signature originates from a pre-specified source of said markup language document incorporated within said markup language document;
   dynamically computing a hash value for said markup language document and comparing said dynamically computed hash value to a hash value encrypted within said digital signature; and,
   detecting content distribution site spoofing either if said digital signature does not originate from said pre-specified source, or if said dynamically computed hash value does not match said hash value encrypted within said digital signature;
   wherein said ensuring step comprises the step of comparing a domain for said digital signature to a domain embedded in a field in said markup language document to ensure that said digital signature originates from said embedded domain.

2. The method of claim 1, wherein said loading step comprises the step of extracting said digital signature from said markup language document.

3. The method of claim 1, further comprising the step of further ensuring that said markup language document originates from a host server at said pre-specified source.

4. The method of claim 1, further comprising the step of further ensuring that said markup language document originates from a host server at said embedded domain.

5. The method of claim 3, further comprising the step the steps of;
   extracting at least one Internet Protocol address from said markup language document; and,
   ensuring that said markup language document originates from a host server having an Internet Protocol address included among said extracted at least one Internet Protocol addresses.

6. The method of claim 1, further comprising the steps of:
   retrieving an embedded slogan from a digital certificate associated with said markup language document; and,
   modifying said markup language document to render said embedded slogan near a portion of said markup language document referencing a pre-specified slogan.

7. The method of claim 6, wherein said embedded slogan is a markup language fragment that, when combined with other markup language fragments in said markup language document, completes said markup language document, and when one of absent and incorrect results in a defective rendering of said markup language document.

8. The method of claim 1, further comprising the step of responsive to detecting content distribution site spoofing, modifying said markup language document to render a warning message.

9. A system for detecting and preventing content distribution site spoofing comprising:
   server-side page security logic; and,
   client-side page security logic cooperatively configured for operation with said server-side page security logic;
   said server-side page security logic comprising program code for
      computing a digital signature for a markup language document, and
      inserting addressing data in said markup language document;
   said client-side page security logic comprising program code for
      ensuring that said digital signature originates from a pre-specified source of said markup language document incorporated within said addressing data,
      comparing a dynamically computed hash value for said markup language document with a hash value encrypted within said digital signature to detect content distribution site spoofing either if said digital signature does not originate from said pre-specified source, or if said dynamically computed hash value does not match said hash value encrypted within said digital signature, and
      retrieving an embedded slogan from a digital certificate associated with said markup language document and modifying said markup language document to render said embedded slogan near a portion of said markup language document referencing a pre-specified slogan.

10. A machine readable storage having stored thereon a computer program for detecting and preventing content distribution site spoofing, the computer program comprising a routine set of instructions which when executed by a machine cause the machine to perform the steps of:
   loading a markup language document and a corresponding digital signature for processing;
   ensuring that said digital signature originates from a pre-specified source of said markup language document incorporated within said markup language document;
   dynamically computing a hash value for said markup language document and comparing said dynamically computed hash value to a hash value encrypted within said digital signature; and,
   detecting content distribution site spoofing either if said digital signature does not originate from said pre-specified source, or if said dynamically computed hash value does not match said hash value encrypted within said digital signature,
   wherein said ensuring step comprises the step of comparing a domain for said digital signature to a domain embedded in a field in said markup language document to ensure that said digital signature originates from said embedded domain.

11. The machine readable storage of claim 10, wherein said loading step comprises the step of extracting said digital signature from said markup language document.

12. The machine readable storage of claim 10, further comprising a routine set of instructions for additionally causing the machine to perform the step of further ensuring that said markup language document originates from a host server at said pre-specified source.

13. The machine readable storage of claim 10, further comprising a routine set of instructions for additionally causing the machine to perform the step of further ensuring that said markup language document originates from a host server at said embedded domain.

14. The machine readable storage of claim 12, further comprising a routine set of instructions for additionally causing the machine to perform the step the steps of;
  extracting at least one Internet Protocol address from said markup language document; and,
  ensuring that said markup language document originates from a host server having an Internet Protocol address included among said extracted at least one Internet Protocol addresses.

15. The machine readable storage of claim 10, further comprising a routine set of instructions for additionally causing the machine to perform the steps of:
  retrieving an embedded slogan from a digital certificate associated with said markup language document; and,
  modifying said markup language document to render said embedded slogan near a portion of said markup language document referencing a pre-specified slogan.

16. The machine readable storage of claim 15, wherein said embedded slogan is a markup language fragment that, when combined with other markup language fragments in said markup language document, completes said markup language document, and when one of absent and incorrect results in a defective rendering of said markup language document.

17. The machine readable storage of claim 10, further comprising a routine set of instructions for additionally causing the machine to perform the step of, responsive to detecting content distribution site spoofing, modifying said markup language document to render a warning message.

18. A system for detecting and preventing content distribution site spoofing comprising the steps of:
  means for loading a markup language document and a corresponding digital signature for processing;
  means for ensuring that said digital signature originates from a pre-specified source of said markup language document incorporated within said markup language document;
  means for dynamically computing a hash value for said markup language document and comparing said dynamically computed hash value to a hash value encrypted within said digital signature; and,
  means for detecting content distribution site spoofing either if said digital signature does not originate from said pre-specified source, or if said dynamically computed hash value does not match said hash value encrypted within said digital signature;
  wherein said means for ensuring comprises means for comparing a domain for said digital signature to a domain embedded in a field in said markup language document to ensure that said digital signature originates from said embedded domain.

* * * * *